United States Patent [19]
McNerney

[11] 3,714,562

[45] Jan. 30, 1973

[54] METHOD AND APPARATUS FOR THE DETECTION OF SELECTED COMPONENTS IN FLUIDS

[75] Inventor: John J. McNerney, Tempe, Ariz.

[73] Assignee: Selco Mining Corporation Limited, Toronta, Ontario, Canada

[22] Filed: April 23, 1971

[21] Appl. No.: 137,684

[52] U.S. Cl. ............... 324/65 R, 23/254 E, 73/27, 338/34
[51] Int. Cl. ................ G01n 27/04, H01c 13/00
[58] Field of Search ...... 324/65, 71; 23/254 E; 73/27; 338/34

[56] References Cited

UNITED STATES PATENTS 3,625,756  12/1971  Taguchi ........................ 324/65 R
3,558,279  1/1971  McRae et al. ..................... 23/254 E

OTHER PUBLICATIONS

Wilhelmsen et al.; Jour. Vacuum Sci & Tech; Vol. 7 No. 1; Jan-Feb. 1970; pp. 39-42.

Primary Examiner—Alfred E. Smith
Attorney—Maybee & Legris

[57] ABSTRACT

A component of a fluid mixture, for example mercury vapor in air, is detected by selectively adsorbing the component onto a conductive thin layer of molecular thickness of a material having a chemical affinity for such component, and observing the resultant change of electrical resistivity of the layer.

16 Claims, 7 Drawing Figures

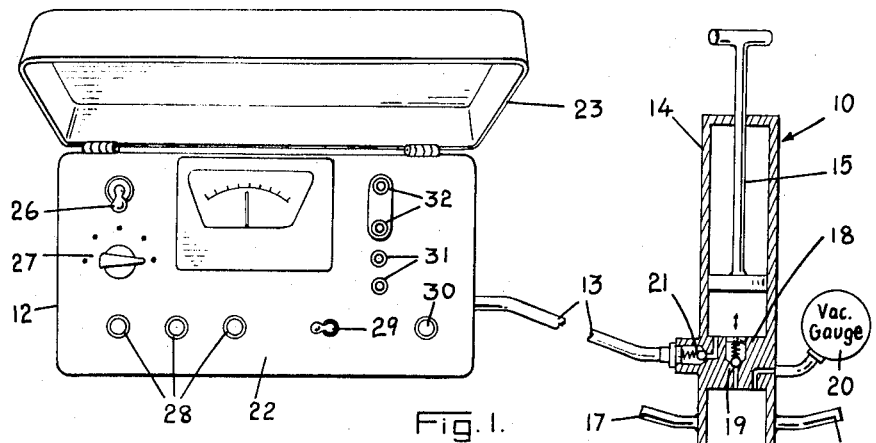
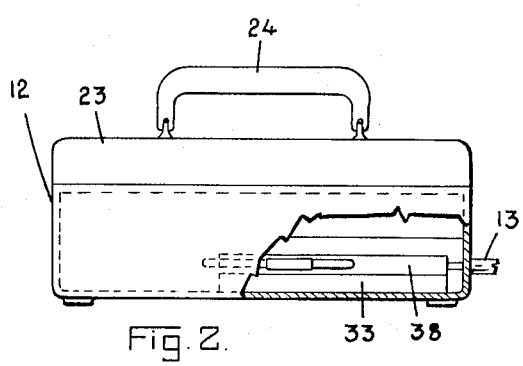
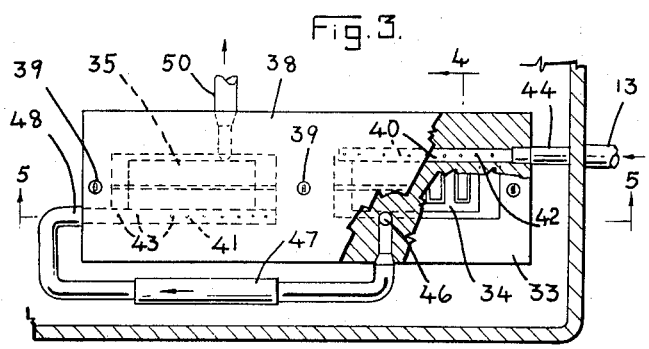
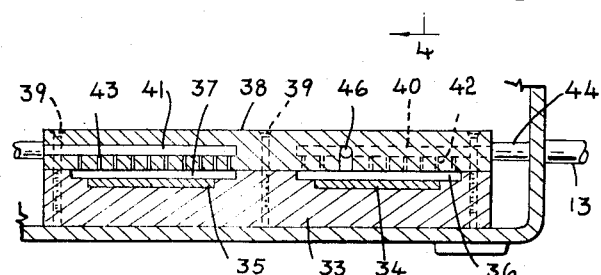
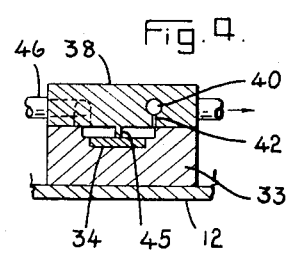
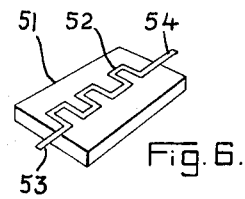

Inventor
John J. McNerney
By Maybee & Legris
Attorneys

METHOD AND APPARATUS FOR THE DETECTION OF SELECTED COMPONENTS IN FLUIDS

BACKGROUND OF THE INVENTION

This invention relates to the detection of selected components in fluid mixtures and is applicable, for example, to the detection and measurement of minute traces of mercury vapor, iodine vapor, or other substances in atmospheric air or in soil gas.

The detection of minute traces of selected components in gaseous mixtures, for example mercury vapor in air, has hitherto relied upon spectrophotometric techniques which, although extremely sensitive, have certain serious limitations. The most serious limitation, especially in the case of mercury vapor detection, is usually set by the presence of interfering substances which absorb electromagnetic energy in the spectral region containing the mercury line. Another serious limitation, where such detection is to be carried out in the field, is the need for an extremely stable voltage source which in effect limits the true portability of any spectrophotometric instrument operating at the extremely high levels of sensitivity required for air and soil gas sampling.

The technique of the present invention represents a radically new approach to the problem of detecting minute traces of vapor in soil gas or in air, and may be applied readily in the field and in the laboratory.

SUMMARY OF THE INVENTION

The present invention is based on the discovery that when a fluid is adsorbed onto a thin layer of conductive material having a chemical affinity for the fluid, the electrical resistance of the layer rises appreciably. For example, a thin film of gold having a thickness less than the mean free path of electrons undergoes a significant rise in resistivity when mercury vapor is adsorbed onto the film, the adsorbed mercury atoms isolating electrons that were formally available for electronic conduction. In the case of a gold film, the film thickness is preferably between 75 and 300 A.U., but may be as high as 700 – 1,000 A.U. The thicker the layer, the less noticeable is the resistance change since the film properties of the layer become masked at greater thicknesses by the properties of the bulk material.

The layer of conductive material is herein described as a "thin layer of molecular thickness," by which is meant that the observable physical characteristics of the layer are determined primarily by the two dimensional configuration of the material and are not the properties of the material in bulk.

According to the present invention, the presence of a selected component in a fluid mixture is detected by selectively adsorbing the component from the fluid mixture onto a thin layer of molecular thickness of an electrically conductive material having a chemical affinity for the component, and detecting the change of resistance of the layer consequent to the adsorption.

In the case of a gold film for the adsorption of mercury vapor, it has been found that the film resistance increases as soon as the film is exposed to the vapor, the resistance change being a function of the vapor concentration. In the course of time, however, the film resistance continues to increase very slowly; it is believed that this further effect, which is quite distinct from the phenomenon on which the invention is based, is due to amalgamation with the gold.

It is to be understood that metals other than gold may be used in the method of the invention. Thus mercury vapor may be detected using, instead of a gold layer, a thin layer of molecular thickness of any metal which has a chemical affinity for mercury. For the detection of mercury vapor in air, however, it is desirable that the metal should be one of the noble metals. Furthermore, other vapors than mercury can be detected by means of this method; the thin layer of conductive material must have a chemical affinity for the vapor to be detected, of course, and in certain circumstances it may be necessary to provide a filter for the removal of substances other than the particular vapor to be detected, if such other substances might be present and would otherwise be adsorbed onto the layer. Thus iodine vapor may be detected using, instead of a gold layer, a thin layer of silver of molecular thickness; if mercury vapor might be present in the gas under examination in such a case, it would be necessary to provide a suitable filter for the selective removal of mercury vapor prior to contacting the gas with the layer.

BRIEF DESCRIPTION OF THE DRAWINGS

One embodiment of the invention will now be described by way of example with reference to the accompanying drawings, in which:

FIG. 1 illustrates an apparatus used to detect mercury vapor in soil gas, together with a pump (shown in section) for extracting a predetermined volume of gas from the soil;

FIG. 2 is a side elevation, partly broken away, of the apparatus shown in FIG. 1;

FIG. 3 is a part sectional plan view of a detail of the apparatus;

FIG. 4 is a section on line 4—4 in FIG. 3;

FIG. 5 is a section on line 5—5 in FIG. 3;

FIG. 6 illustrates a component element of the apparatus; and

Figure 7:
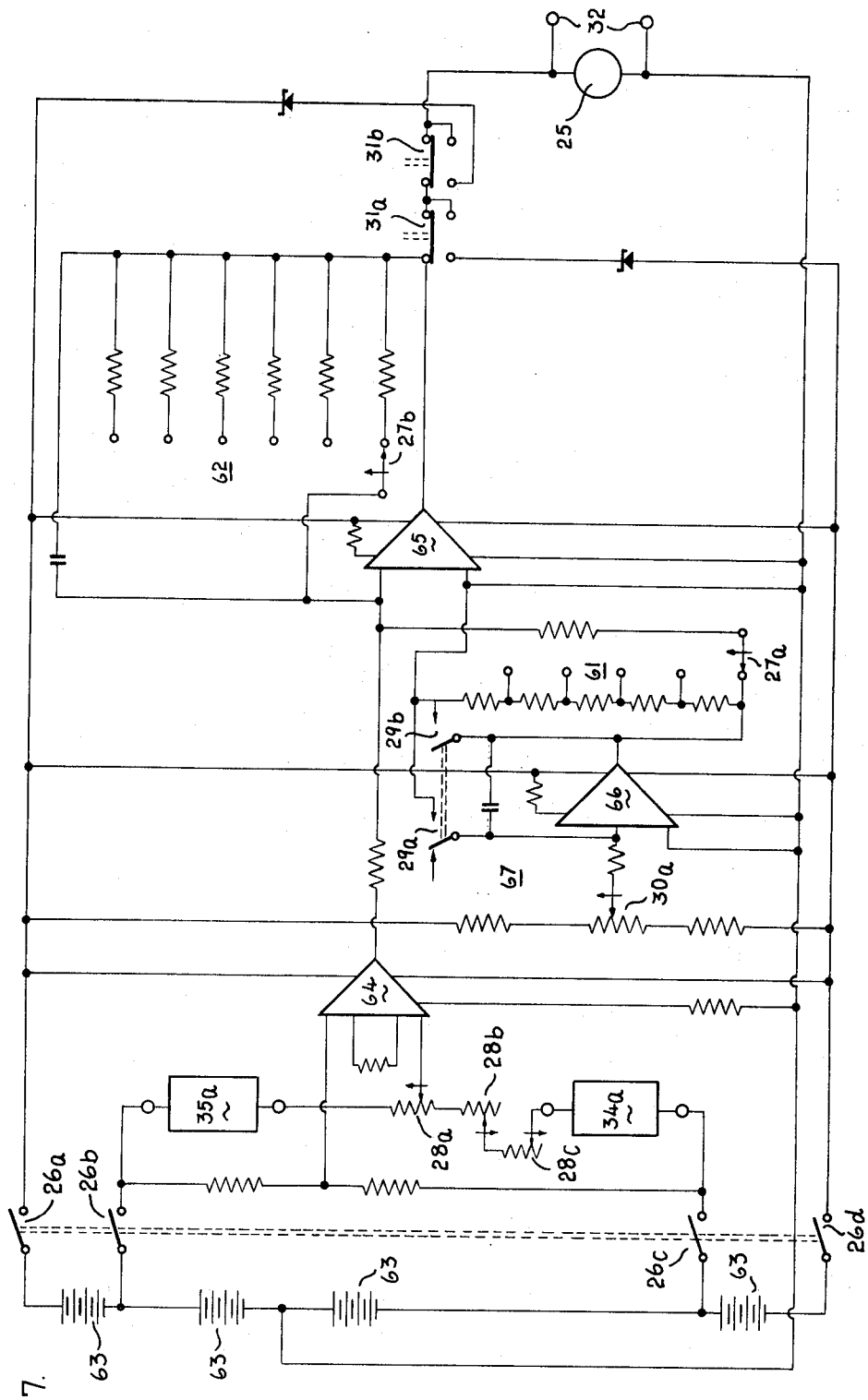
FIG. 7 is a wiring diagram of a circuit used to detect or measure resistance changes due to the adsorption of mercury vapor.

The assembly illustrated in FIG. 1 comprises a pump 10 for extracting samples of soil gas from the ground 11, and delivering the gas samples to a detecting apparatus 12 by way of a tubular connection 13.

In practice it is found desirable to provide an intermediate stage between the pump and the apparatus 12. The intermediate stage may consist of a casing containing a silver mesh to collect mercury by adsorption from the gas sample, and a heater to drive off the adsorbed mercury vapor. The stage is first connected to the pump to receive the sample, and is subsequently connected to the apparatus, the adsorbed mercury vapor being driven off and passed into the apparatus. The pump 10 comprises a cylinder portion 14 in which a hand-operated plunger 15 can slide, a tubular probe portion 16 which is adapted to be driven into the soil to a depth determined by a pair of lateral arms 17, and an intermediate portion 18. Although the portions 14, 16 and 18 are shown in the drawing as being in one piece, they are preferably separate components that can be readily coupled together. To obtain a gas sample, the probe portion 16 is driven into the soil to the appropriate depth and the plunger 15 is raised from the bottom to the top of the cylinder 14. A predetermined volume of soil gas thereby passes into the cylinder 14 by way of a spring-loaded check valve 19, a vacuum gauge 20 being used to indicate the pressure within the tubular probe and so provide an indication of the required quantity of soil gas having been extracted. By pushing down the plunger 15, the soil gas is subsequently expelled from the cylinder portion 14 via a second spring-loaded check valve 21 and through the tubular connection 13 and to the apparatus 12 preferably by way of the intermediate stage referred to.

The apparatus 12 provides a box-like casing which houses the components of the apparatus as described hereinafter, and an instrument panel 22 which is protected by a lid 23, the lid 23 having a handle 24 for the purpose of carrying the apparatus. On the instrument panel 22 are shown a volt meter 24, an ON-OFF switch 26, a sensitivity selector control 27, zero adjustment controls 28, a drift compensator switch 29 and control 30, battery test terminals 31, and terminals 32 for connection to an external recorder when required.

Located in the bottom part of the casing of the apparatus 12 is a battery of mercury cells providing a stable source of voltage for the bridge circuit shown in FIG. 7. A first metal block 33 mounted within the casing of the apparatus 12 has a flat upper face which is recessed to provide respective seatings for a pair of sensor elements 34, 35 and shallow spaces 36, 37 immediately above the detector elements. A second metal block 38 is clamped to the upper face of the first block 33 by screws 39, thus covering the elements 34, 35 and closing the spaces 36, 37. The block 38 is formed with a pair of identical tubular passages 40, 41 which communicate with the spaces 36 and 37 respectively by series of very fine orifices 42, 43. One end of the passage 40 is connected to the tubular connection 13 by way of an adaptor 44, and gas flowing into the passage 40 by way of the tubular connection and adaptor flows through the orifices 42 onto the upper surface of the sensor 34. The space 36 is divided longitudinally by a baffle 45 depending from the bottom face of the block 33, so that all gas passing through the space 36 is forced to flow across the upper surface of the sensor 34, and in close proximity to it, before passing to an outlet 46. The outlet 46 is connected by way of a connecting passage containing a mercury vapor filter 47 to an inlet 48 at one end of the passage 41. The mercury vapor filter may be of the silver mesh type. Gas flowing into the passage 41 flows through the orifices 43 into the space 37 and is compelled to flow very close to the surface of the sensor element 35 by reason of a second barrier disposed in the same manner as the barrier 45. The gas which passes from the space 37 is discharged to atmosphere through an outlet 50.

Each of the sensor elements 34, 35 comprises a thin rectangular glass plate 51 (FIG. 6) constituting a substrate on which a thin layer of gold molecular thickness has been deposited, the configuration of the gold layer 52 being such as to provide a reasonably large surface area of gold and a reasonably long resistance path between terminals 53, 54. In operation of the apparatus the resistance of the gold layer between terminal electrodes 53 and 54 is caused to change by reason of the adsorption of mercury vapor and other vapors onto it, the resistance change being a function of the concentration of the vapors adsorbed. This resistance change in the first sensor element 34 is to be compared with the resistance change of the sensor element 35 when the same gas sample flows over the gold layer thereon. Since mercury vapor is prevented from reaching the element 35 by the filter 47, any difference between the resistance changes must be due to the adsorption of mercury vapor on the surface of the first detecting element alone.

In the apparatus of the present example the gold layer forming the resistance path of each sensor element should preferably be from 75 A.U. to 300 A.U. in thickness, giving a resistance of 500 to 70 ohms.

FIG. 7 is an electrical circuit diagram of the apparatus. The resistances formed by the sensors 34 and 35 are indicated at 34a, 35a. These resistances are connected in two arms of a resistance bridge circuit having a pair of ratio arms formed by a resistance chain 61 and a set of resistances 62. Selection of the resistance values of the ratio arms is made by means of a pair of gauged selector switches 27a, 27b operated by the sensitivity selector control 27 (FIG. 1). The bridge circuit is supplied from a battery of mercury cells 63, to which it is connected by respective contacts 26a, 26b, 26c and 26d of the ON-OFF switch 26 (FIG. 1). Out of balance bridge current is converted to a voltage signal and amplified by first and second operational amplifiers 64, 65, and applied to the center-zero voltmeter 25. Coarse, medium and fine controls for zero adjustment of the apparatus are furnished by respective potentiometers 28a, 28b and 28c connected between the sensor resistances 34a, 35a and adjusted by means of the zero adjustment controls 28 (FIG. 1). To provide compensation for d.c. drift an operational amplifier 66 is connected in a drift compensation circuit 67 including a variable resistance 30a, which is set by the compensation control 30 of FIG. 1, and switch contacts 29a, 29b, which are operated by the compensation switch 29 of FIG. 1. Also represented in FIG. 7 are a pair of switches 31a, 31b operated by the pushbuttons 31 for battery testing, and the pair of terminals 32 to connecting an external recorder to the apparatus.

In order to use the apparatus for the detection of mercury vapor in soil gas, the pump is connected to the intermediate stage previously referred to, and the pump probe is driven in the ground to the required depth. A predetermined quantity of soil gas is extracted by means of the pump and passed via the tubular connection 13 to the intermediate stage, where any mercury vapor is adsorbed onto the silver mesh collector of the stage. After setting up the apparatus by means of the zero adjustment and drift compensation controls, the adsorbed vapor is driven off by heating, and then is carried by a gas current and passed via the tubular connection 13 to the gas flow path within the apparatus, the gas flowing successively over the gold layer of the sensor element 34, through the silver mesh filter 47 where any residual mercury vapor is removed, and then over the gold layer of the reference sensor element 35. In general the resistance values of the sensor elements 34 and 35 may change due to the adsorption of vapors from the gas sample onto the gold layers. The sensor elements are practically identical in form and configuration and have substantially identical adsorption-resistance characteristics. However, if mercury vapor is present in the gas sample, this is adsorbed onto the gold layer of the first sensor element 34 only, as it is prevented from reaching the second sensor element 35 by the filter 47. The detection of mercury vapor therefore produces a differential resistance change, the magnitude of which is an indication of the concentration of mercury vapor. As a result of the differential resistance change the bridge circuit is unbalanced, the amount of unbalance being indicated by the voltmeter 25, which can therefore be calibrated in terms of mercury vapor concentration.

Adsorbed mercury and other adsorbed substances can subsequently be removed from the gold layers by heating.

The apparatus may be readily adapted for the detection of vapors other than mercury, either in soil gas or in atmospheric air. The conductive thin layers of the sensor elements must of course be of a material which has a chemical affinity for the particular vapor or vapors to be detected, and the filter 47 must be capable of selectively removing such vapor or vapors. For example, for the detection of iodine vapor in air or soil gas, the conductive thin layers should preferably be of silver, and the filter 47 may take the form of a porous silver body providing a large surface area in the gas flow path for the adsorption of residual iodine vapor. Since silver has also a chemical affinity for mercury, it may be necessary to place a suitable mesh filter at the inlet to the passage 40 (FIGS. 3 and 5) so as to remove any mercury vapor which might be present in the gas under examination.

Although the invention has been particularly described with reference to the detection of mercury vapor or iodine vapor in gaseous mixtures, it is not limited thereto in its applications. Broadly speaking the invention is readily applicable to the detection of a selected component in a gas or liquid by passing the gas or liquid over a thin layer of molecular thickness of a material onto which the component is adsorbed, and observing the resultant change in electrical resistance of the layer. For convenience of observing and interpreting the resultant resistance change, the detection apparatus may include a pair of identical sensor elements which are connected electrically in a resistance bridge circuit, and physically mounted so that the fluid under examination passes over the sensor elements in succession, any residual component to be detected being filtered from the fluid before the fluid passes over the second sensor element, which provides a reference.

What I claim as my invention is:

1. A method of detecting the presence of a selected component in a fluid mixture which comprises selectively adsorbing the component from the mixture onto a thin layer of molecular thickness of a metal having a chemical affinity for the component, and detecting the change of resistance of the layer consequent to the adsorption.

2. A method of detecting the presence of a selected component in a gas, which comprises passing an electric current through a thin layer of molecular thickness of a metal having a chemical affinity for the component to be detected, passing a predetermined quantity of the gas over the layer so as to remove such component therefrom by chemisorption onto the layer, and measuring the change in the electric current passing through the layer.

3. The method claimed in claim 2, wherein the component to be detected is mercury vapor and the metal is one having an affinity for mercury and a capacity for forming solid solutions therewith.

4. The method claimed in claim 3, wherein the metal is a noble metal.

5. The method claimed in claim 4, wherein the metal is gold.

6. The method claimed in claim 2, wherein the component to be detected is iodine vapor and the metal is silver.

7. Apparatus for detecting the presence of a selected component in a gas, comprising: means defining a substrate, a thin layer of molecular thickness of a metal having a chemical affinity for the component, the layer being deposited on the substrate, means for passing the gas over the layer so that such component is removed from the gas by selective adsorption onto the layer, and circuit means connected to the layer for detecting the change of resistance of the layer consequent to the adsorption.

8. Apparatus for detecting the presence of a selected component in a gas, comprising:
    means defining a substrate;
    a thin layer of molecular thickness of a metal having a chemical affinity for the component deposited on the substrate;
    a pair of electrodes making contact with the layer;
    circuit means connected between the electrodes for passing electric current through the layer; and
    means defining a gas flow path for causing the gas to flow over the layer whereby the component to be detected is removed from the gas by chemisorption onto the layer,
    said circuit means including current responsive means for indicating a change in current consequent to a change in the resistance of the layer.

9. Apparatus according to claim 8 for the detection of mercury vapor in air, wherein the metal is one having an affinity for mercury and a capacity for forming solid solutions therewith.

10. Apparatus according to claim 9, wherein the metal is a noble metal.

11. Apparatus according to claim 10, wherein the metal is gold.

12. Apparatus according to claim 8, for the detection of iodine vapor in air, wherein the metal is silver.

13. Apparatus for detecting the presence of a selected component in a gas comprising:
    first and second identical sensor means:
    each of said sensor means consisting of a substrate supporting a thin layer of molecular thickness of a metal having a chemical affinity for the component to be detected, and a pair of electrodes making contact with the layer;
    circuit means connected with the pairs of electrodes and adapted for comparing resistance changes of the respective sensor means;
    structural means defining a gas flow path for the passage of said gas, the gas flow path consisting of fist and second series-connected passages and a connecting passage therebetween the first sensor means being mounted in the first passage, the second sensor means being mounted in the second passage, and the connecting passage containing a filter for the removal of such component residual in the gas flowing from the first passage to the second passage, whereby the said component is selectively adsorbed onto the layer of the first sensor means.

14. Apparatus according to claim 13 for the detection of mercury vapor in air, wherein the metal of the layers is a noble metal.

15. Apparatus according to claim 14, wherein the metal of the layers is gold.

16. Apparatus according to claim 13 for the detection of iodine vapor in air, wherein the metal of the layers is silver.

* * * * *